(12) United States Patent
Nakamura et al.

(10) Patent No.: US 7,054,110 B2
(45) Date of Patent: May 30, 2006

(54) CARRIAGE ARM ASSEMBLY OF DISK DRIVE

(75) Inventors: Yoshihiko Nakamura, Kawasaki (JP); Takashi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/885,826

(22) Filed: Jul. 7, 2004

(65) Prior Publication Data

US 2004/0240119 A1    Dec. 2, 2004

Related U.S. Application Data

(63) Continuation of application No. PCT/JP02/000039, filed on Jan. 9, 2002.

(51) Int. Cl.
  *G11B 5/55*  (2006.01)
  *G11B 21/08* (2006.01)
  *H01H 51/22* (2006.01)

(52) U.S. Cl. .................... 360/264.2; 360/264.3
(58) Field of Classification Search ............. None
  See application file for complete search history.

(56) References Cited

U.S. PATENT DOCUMENTS

| 4,564,723 | A | * | 1/1986 | Lang ................. 174/36 |
| 5,012,368 | A | * | 4/1991 | Bosier et al. ......... 360/264.2 |
| 5,555,619 | A | * | 9/1996 | Maggio et al. ........ 360/264.2 |
| 5,731,930 | A | * | 3/1998 | Maggio et al. ........ 360/264.2 |
| 5,844,753 | A | * | 12/1998 | Inaba ................ 360/264.2 |
| 6,075,676 | A | * | 6/2000 | Hiraoka et al. ........ 360/264.2 |
| 6,134,084 | A | * | 10/2000 | Ohwe et al. .......... 360/264.2 |
| 6,154,344 | A | * | 11/2000 | Marek ................ 360/264.2 |
| 6,201,667 | B1 | * | 3/2001 | Yamamoto et al. ...... 360/264.2 |
| 6,288,877 | B1 | * | 9/2001 | Khan et al. .......... 360/245.9 |
| 6,480,362 | B1 | * | 11/2002 | Yoshida et al. ....... 360/264.2 |

FOREIGN PATENT DOCUMENTS

| JP | 1-159210 | 11/1989 |
| JP | 3-93023 | 4/1991 |
| JP | 11-250434 | 9/1999 |
| JP | 2002352628 A | * 12/2002 |

* cited by examiner

*Primary Examiner*—Andrea Wellington
*Assistant Examiner*—Nathan Danielsen
(74) *Attorney, Agent, or Firm*—Greer, Burns & Crain, Ltd.

(57) ABSTRACT

A carriage arm assembly is disclosed that has a sub-assembly and a signal relay member that is arranged on a side surface of an arm portion of a carriage arm of the sub-assembly for connection between a head slider and a head IC. The signal relay member includes a wire, a wrapping portion that is formed from a synthesized resin mixed with a charging prevention agent, and two pairs of hooks that are projecting from the wrapping portion. When the hooks are in contact with the arm portion of the carriage arm, static electricity possessed by the signal relay member flows away through the carriage arm, and this prevents a magnetic head at the end of the head slider from being destroyed by the static electricity. In addition, the hooks are engaged with grooves on the signal relay member so as to position the signal relay member on the arm portion.

5 Claims, 10 Drawing Sheets

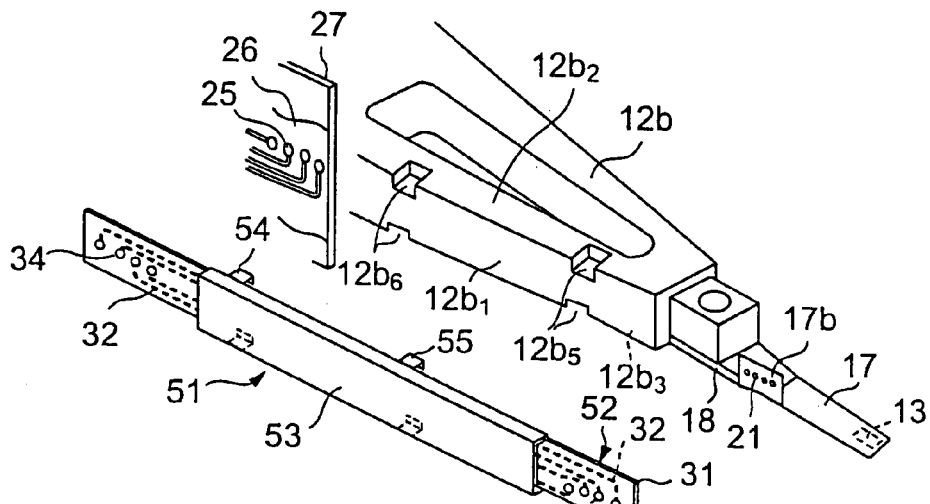
FIG.10
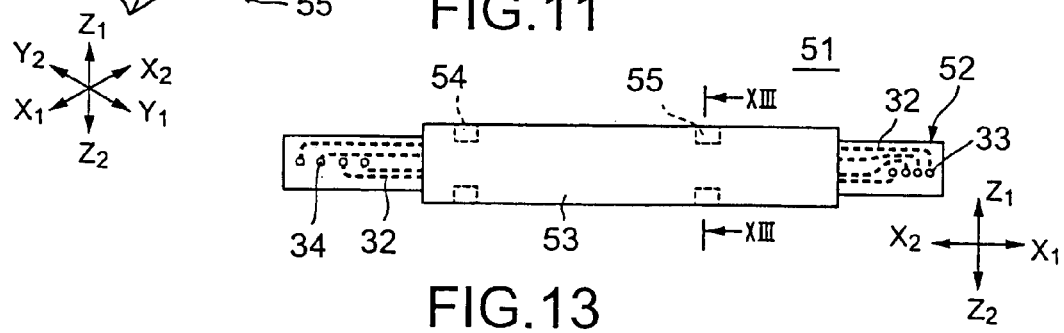
FIG.12
FIG.11
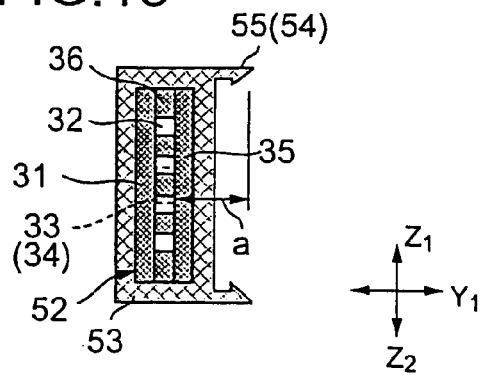
FIG.13

CARRIAGE ARM ASSEMBLY OF DISK DRIVE

This is a continuation of International PCT Application No. PCT/JP2002/000039 filed Jan. 9, 2002.

TECHNICAL FIELD

The present invention generally relates to a carriage arm assembly of a disk drive, and in particular, to a carriage arm assembly of a magnetic disk drive.

A hard disk drive has a structure in which a hard disk, a carriage arm assembly, and a magnetic circuit for driving the carriage arm assembly are installed on a chassis base.

Generally, the carriage arm assembly includes a carriage arm body, a driving coil portion, a bearing member, a head slider including a magnetic head embedded at one end thereof, a flexible board with a head IC built thereon, and a signal relay member for electrically connecting the head slider with the head IC. Generally, this carriage arm assembly is manufactured by first building a sub-assembly, and then mounting the signal relay member thereon.

Usually, it is desirable that the signal relay member be mounted easily.

Along with an increasing capacity of the hard disk drive, the magnetic head embedded at one end of the head slider is being made smaller and smaller, corresponding wiring patterns are becoming very thin, and this lowers the resistance of the magnetic head against static electricity. For this reason, it is required that the magnetic head not be subjected to static electricity when manufacturing the carriage arm assembly. If static electricity is applied on the magnetic head, the wiring patterns may be shorted or disconnected sometimes, and this may cause the magnetic head to fail to operate. Further, even when problems occur in the magnetic head, usually one is unable to be aware of this when manufacturing the carriage arm assembly. Usually, the problems in the magnetic head are first observed after the carriage arm assembly is manufactured, and when testing the magnetic head with the magnetic head being set in a testing device. This is troublesome.

Investigating the whole process of manufacturing the carriage arm assembly, it is found that the process in which the magnetic head is liable to be subjected to static electricity is the process of mounting the signal relay member on the sub-assembly. Therefore, it is necessary to take measures so that the magnetic head is not subjected to static electricity in the process of mounting the signal relay member on the sub-assembly.

BACKGROUND ART

FIG. 1 is a view showing a carriage arm assembly 10 of the related art, where the axis X1–X2 represents the longitudinal direction, the axis Y1–Y2 represents the width direction, and the axis Z1–Z2 represents the height direction. The carriage arm assembly 10 has a structure in which a signal relay member 30 is mounted on a sub-assembly 11.

First, an explanation is given to the sub-assembly 11. Generally, the sub-assembly 11 includes a carriage arm body 12, a head slider 13, a driving coil 14, a bearing member 15, and a head IC 16.

The carriage arm body 12 is made of metals, includes a cylindrical housing 12a, an arm portion 12b extending from the cylindrical housing 12a in the X1 direction, and a fork portion 12c extending from the cylindrical housing 12a in the X2 direction.

The head slider 13 includes a magnetic head 19 that is embedded in one end thereof by photolithography, and is installed in gimbals 17a of a suspension 17 on the X1 side. The other end of the suspension 17 on the X2 side is fixed at a spacer 18, and the spacer 18 is fixed at an end of the arm portion 12b. The suspension 17 has a handle 17a at the end of the suspension 17 on the X2 side; the handle 17a is on the Y2 side of the suspension 17, and is projecting in the Z1 direction. In the suspension 17, a wiring pattern 20 is formed between the gimbals 17a and the handle 17b. Terminals on the magnetic head 19 are electrically connected with terminals on one end of the wiring pattern 20. The other end of the wiring pattern 20 reaches the handle 17b, and functions as terminals 21. On the handle 17b, four terminals are arranged in a line. The terminals 21 are at positions at the same height as a long and narrow side surface 12b1 of the arm portion 12b.

The driving coil 14 is roughly a square, being fixed on the fork portion 12c. The bearing member 15 is installed in the housing 12a.

The head IC 16 is built on a flexible board 26, on which a wiring pattern and terminals 25 are formed. The flexible board 26 is bonded on a base metal plate 27.

The base metal plate 27 is screwed to a side surface of the housing 12a on the Y2 side. A U-shaped bending portion of the base metal plate 27 functions as a connector 28.

After the carriage arm assembly 10 is installed in the hard disk drive, the connector 28 is connected to a flexible cable connector extending from a printing board of the hard disk drive, and thereby, the head IC 16 is electrically connected to a hard disk controller on the printing board. Terminals 25 are at positions closer to the X1 side than the head IC 16, and arranged in a line at positions at the same height as the long and narrow side surface 12b1 of the arm portion 12b. So far, the structure of the sub-assembly 11 is described.

FIG. 2, FIG. 3 and FIG. 4 show the signal relay member 30.

The signal relay member 30 has a long and narrow shape in correspondence to the shape of the side surface 12b1 of the arm portion 12b, and a copper wiring pattern 32 and terminals 33 and 34 at ends of the wiring pattern 32 are formed on a polyimide flexible base 31 of the signal relay member 30. A polyimide flexible cover 35 is bonded on the flexible base 31 by using a polyamide adhesive agent 36 to cover the wiring pattern 32. A two-sided adhesive tape 37 with a protection sheet thereon is pasted on the flexible cover 35.

After the protection sheet is removed, as illustrated in FIG. 5, the signal relay member 30 is fixed up with the side surface 12b1 of the arm portion 12b of the sub-assembly 11, which is supported by an assembling fixture 40 with the bearing member 15 being supported by the assembling fixture 40, and as illustrated in FIG. 6, the signal relay member 30 is bonded to the side surface 12b1 by the two-sided adhesive tape 37, then is heated with solder, as illustrated in FIG. 7, so that the terminals 33 are bonded with the terminals 21, and the terminals 34 are bonded with the terminals 25. In this way, the carriage arm assembly 10 is manufactured.

The magnetic head 19 is electrically connected to the head IC 16 through the wiring pattern 20 and the signal relay member 30. The assembling fixture 40 is grounded to prevent static electricity.

The signal relay member 30 may become charged with static electricity if it is subjected to friction while being mounted. However, because the whole surface of the signal relay member 30 is made of polyimide, which is insulating, when being mounted, even when the signal relay member 30 is in contact with the metal arm portion 12b, the static electricity can hardly flow to the carriage arm body 12, and the signal relay member 30 sill possesses static electricity. When the terminals 33 are bonded to the terminals 21, the static electricity flows to the magnetic head 19 through the terminals 33, terminals 21, and the wiring pattern 32, and depending on the situation, the magnetic head 19 may be destroyed by the static electricity.

In addition, the mounting position of the signal relay member 30 on the side surface 12b1 of the arm portion 12b is not uniquely defined, thus bonding of the terminals 33 with the terminals 21 and bonding of the terminals 34 with the terminals 25 are troublesome, that is, operability is low.

DISCLOSURE OF THE INVENTION

A first object of the present invention is to provide a carriage arm assembly of a disk drive that allows static electricity on a signal relay member to flow to a carriage arm body while the signal relay member is being mounted on the carriage arm body so as to prevent the static electricity from flowing to a magnetic head and thereby preventing the magnetic head from being destroyed by the static electricity.

To attain the above object, according to the present invention, there is provided a carriage arm assembly installed in a magnetic disk drive. The carriage arm assembly includes a sub-assembly that has a carriage arm, a head slider arranged at an end of the carriage arm, and a head IC on a base; and a signal relay member that is arranged on a side surface of an arm portion of the carriage arm of the sub-assembly to connect the head slider and the head IC.

The signal relay member includes a wire, a wrapping portion that is formed from a synthesized resin mixed with a charging prevention agent, and a hook part that is projecting from the wrapping portion.

In the arm portion of the carriage arm, grooves are formed for engagement with the hook part.

The signal relay member is installed by engaging the hook part with the grooves.

When the hook part is in contact with the arm portion of the carriage arm, the static electricity possessed by the signal relay member escapes through the carriage arm, therefore, it is possible to prevent a magnetic head at the end of the head slider from being destroyed by static electricity.

In addition, engagement of the hook part into the grooves help position the signal relay member relative to the arm portion.

A second object of the present invention is to provide a carriage arm assembly of a disk drive that allows a signal relay member to be uniquely positioned when attaching the signal relay member to a carriage arm so as to improve operability of attaching the signal relay member to the carriage arm.

BRIEF DESCRIPTION OF THE DRAWINGS

FIG. 10 a perspective view of a signal relay member and the corresponding arm portion;

FIG. 11 is a front view of the signal relay member in FIG. 10;

FIG. 12 a perspective view of hooks of the signal relay member in FIG. 10;

FIG. 13 is an enlarged cross-sectional view of the signal relay member along the line VIII—VIII in FIG. 11;

BEST MODE FOR CARRYING OUT THE INVENTION

Below, preferred embodiments of the present invention are explained with reference to the accompanying drawings.

First Embodiment

Figure 8:
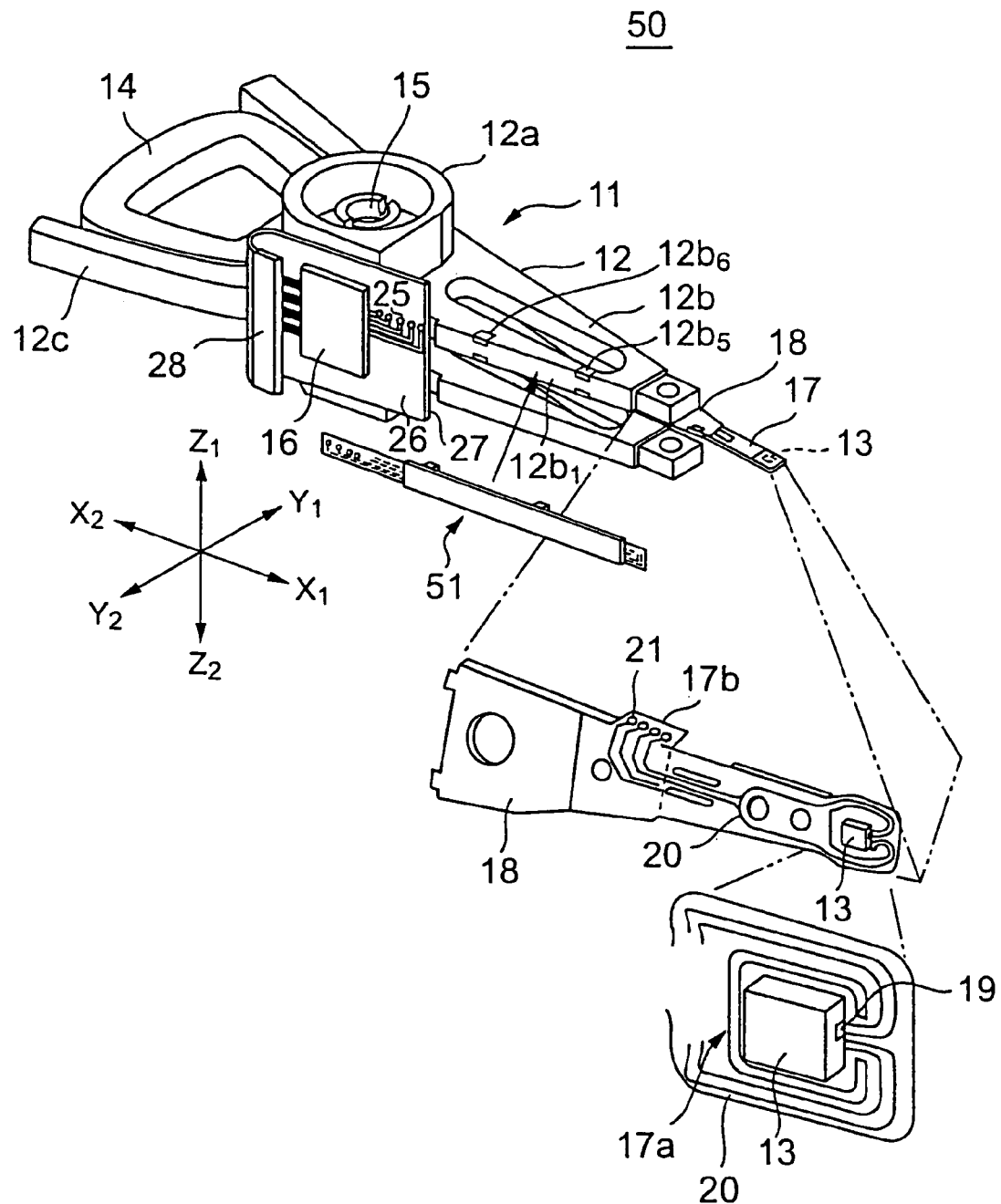
FIG. 8 is a perspective view of a carriage arm assembly according to a first embodiment of the present invention.

FIG. 8 is a perspective view of a carriage arm assembly 50 according to a first embodiment of the present invention.

Figure 9:
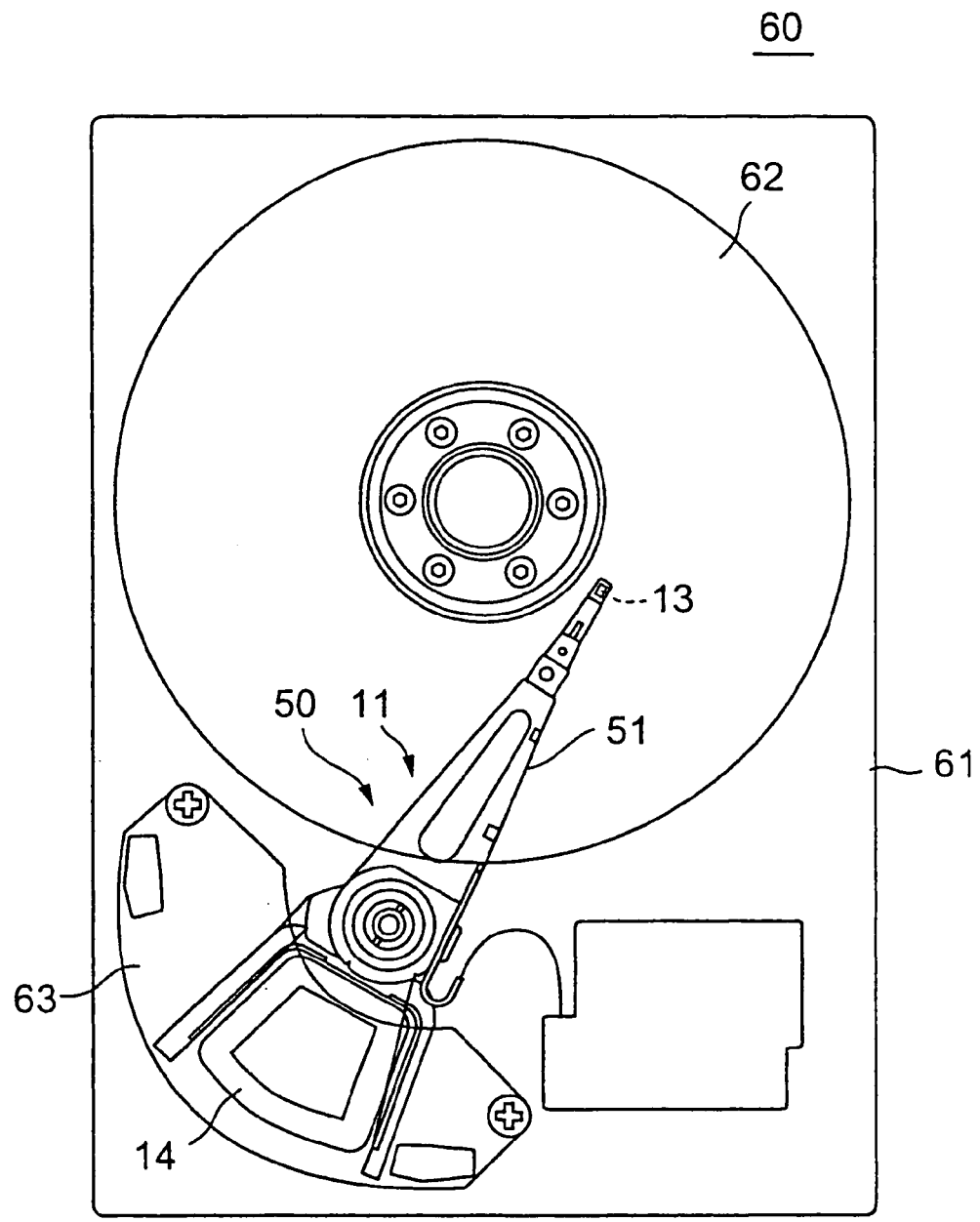
FIG. 9 is a plan view of a hard disk drive in which the carriage arm assembly in FIG. 8 is installed.

FIG. 9 is a view of a hard disk drive 60 in which the carriage arm assembly 50 in FIG. 8 is installed.

The hard disk drive 60 includes a hard disk 62, a carriage arm assembly 50, and a magnetic circuit 63 for driving the carriage arm assembly 50, and all of them are installed in an enclosure 61.

Figure 1:
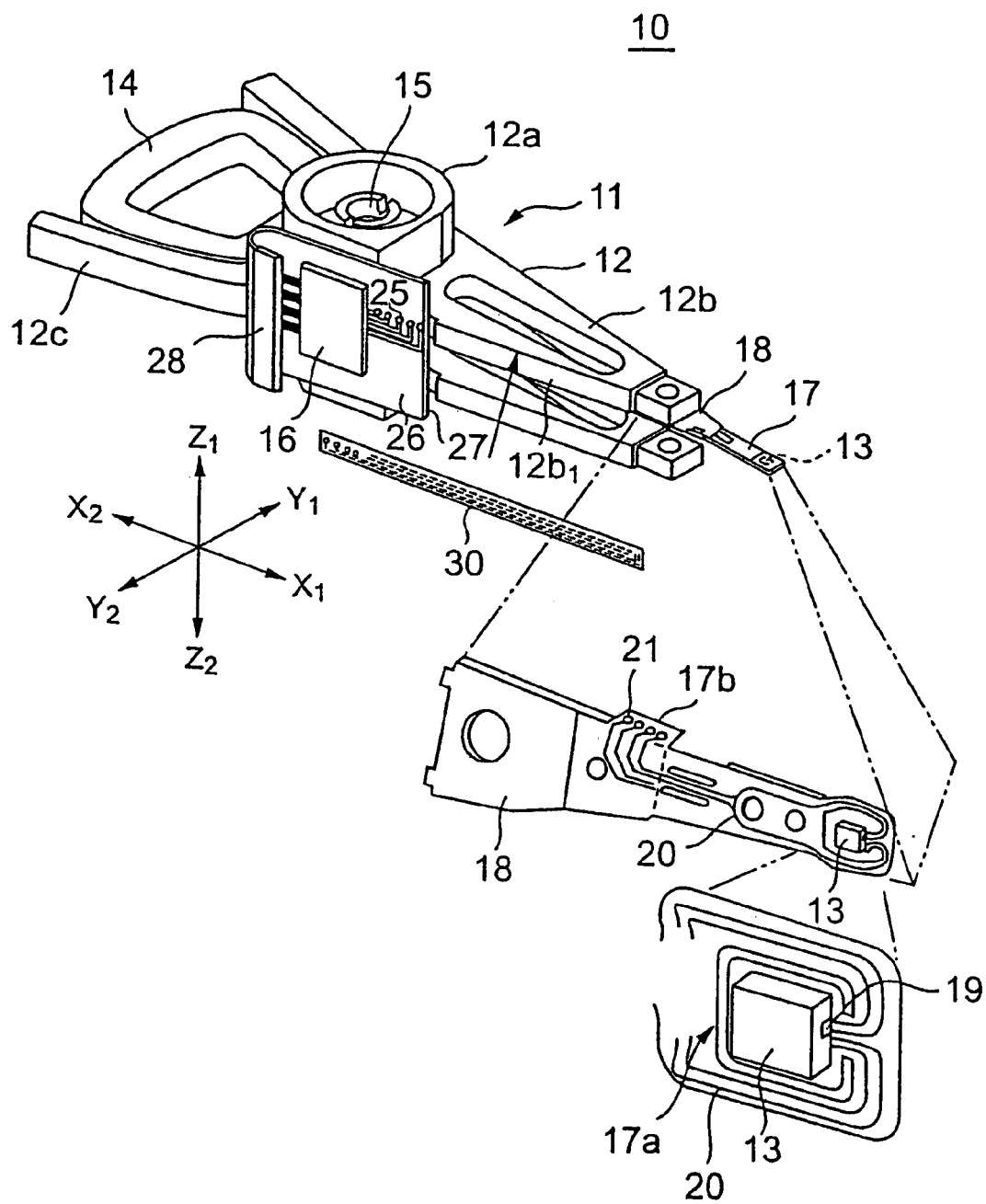
FIG. 1 is a perspective view of a carriage arm assembly of the related art.

The carriage arm assembly 50 has the same structure as that of the carriage arm assembly 10 shown in FIG. 1 except for a signal relay member 51 and elements related to the signal relay member 51. In FIG. 8, the same reference numbers are used for the same elements as those shown in FIG. 1, and descriptions are omitted.

Figure 2:
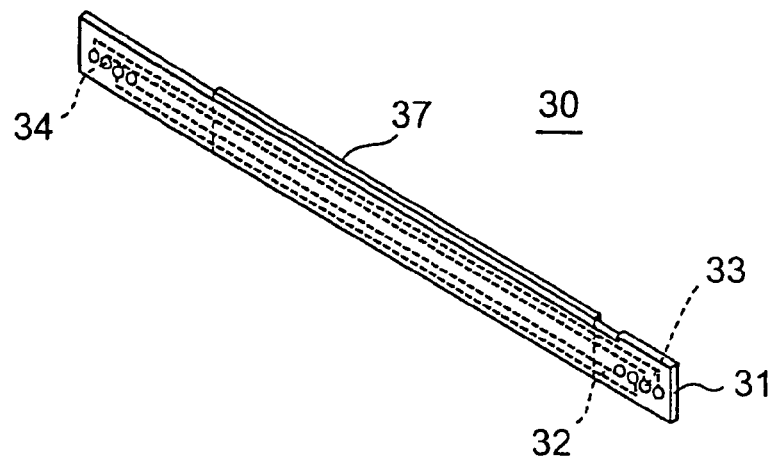
FIG. 2 is a perspective view of a signal relay member.
Figure 3:
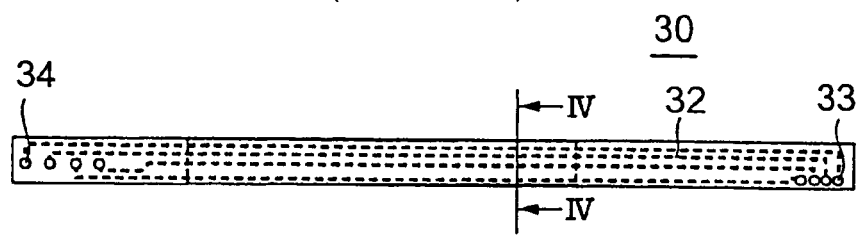
FIG. 3 is a view of the signal relay member.
Figure 4:
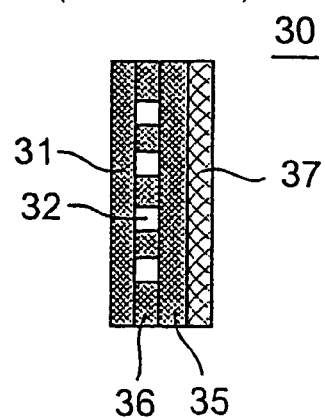
FIG. 4 is an enlarged cross-sectional view of the signal relay member along the line IV—IV in FIG. 3.
Figure 5:
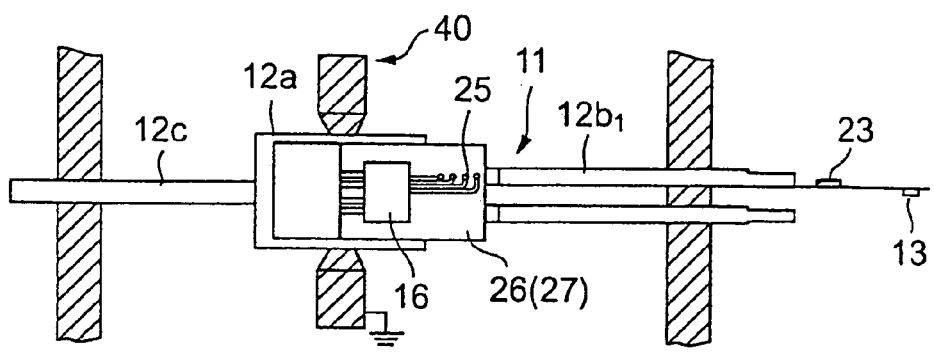
FIG. 5 is a view showing a state of fixing a sub-assembly by a fixture.
Figure 6:
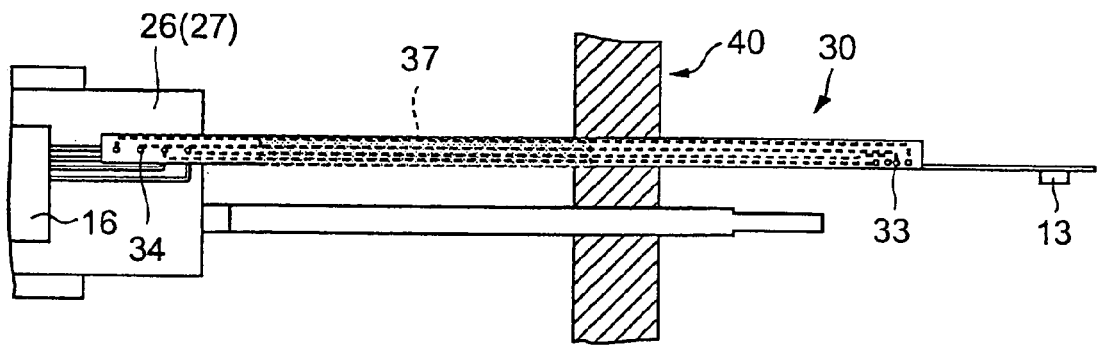
FIG. 6 is a view showing attachment of the signal relay member to the sub-assembly.
Figure 7:
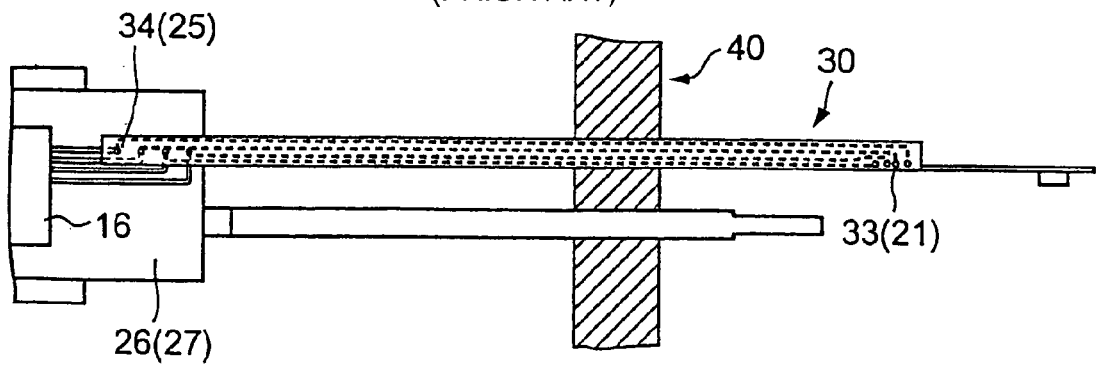
FIG. 7 is a view showing connection of terminals of the signal relay member.

The signal relay member 51, as illustrated in FIG. 10 through FIG. 13, has a structure in which a signal relay member body 52 is wrapped by a wrapping portion 53. In other words, the two-sided adhesive tape 36 is removed from the signal relay member 30 shown in FIG. 2, FIG. 3, and FIG. 4, and instead of the two-sided adhesive tape 36, the wrapping portion 53 is provided, forming the signal relay member 51.

The signal relay member body 52 has a polyimide flexible base 31, a copper wiring pattern 32 formed thereon, terminals 33 and 34 at ends of the wiring pattern 32, and a polyimide flexible cover 35 bonded on the flexible base 31 by using a polyamide adhesive agent 36 to cover the wiring pattern 32.

Terminals 33 and 34 are exposed. Solder films are provided on surfaces of the terminals 33 and 34 and the terminals 21 and 25.

The wrapping portion 53 is formed by insertion molding on the flexible cover 35 but not on the end portions of the signal relay member body 52 having the terminals 33 and 34. The wrapping portion 53 has a first pair of hooks 54 and a second pair of hooks 55, which are apart from each other in the X1–X2 direction, and are projecting to the Y1 direction. The wrapping portion 53, and the hooks 54, 55, are formed from polycarbonate mixed with carbon acting as a charging prevention agent, and thus are conductive. Ends of the hooks 54, 55 are at positions being separated by a distance "a" from the terminals 33 and 34 toward the Y1 direction.

As illustrated in FIG. 10, on an upper surface 12b2 and a lower surface 12b3 of the arm portion 12b of the carriage arm body 12 and on the sides of the surfaces 12b2 and 12b3 joining with the side surface 12b1, grooves 12b5 and 12b6 are formed to lock the hooks 54, 55.

Next, an explanation is given to the operation of attaching the signal relay member 51 to the arm portion 12b of the carriage arm body 12.

Figure 14:
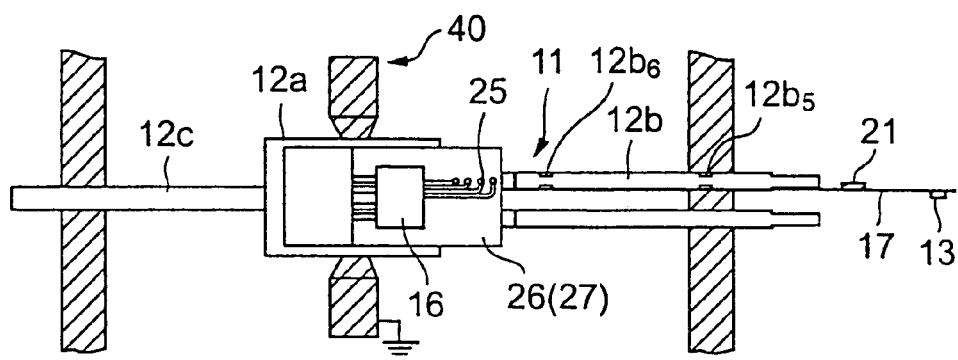
FIG. 14 is a view showing a state of fixing a sub-assembly by a fixture.

As illustrated in FIG. 14, similar to the related art, the assembling fixture 40 is used. The assembling fixture 40 is grounded to prevent static electricity. The bearing member 15 is held by the assembling fixture 40, thereby, sub-assembly 11 is supported.

Figure 15:
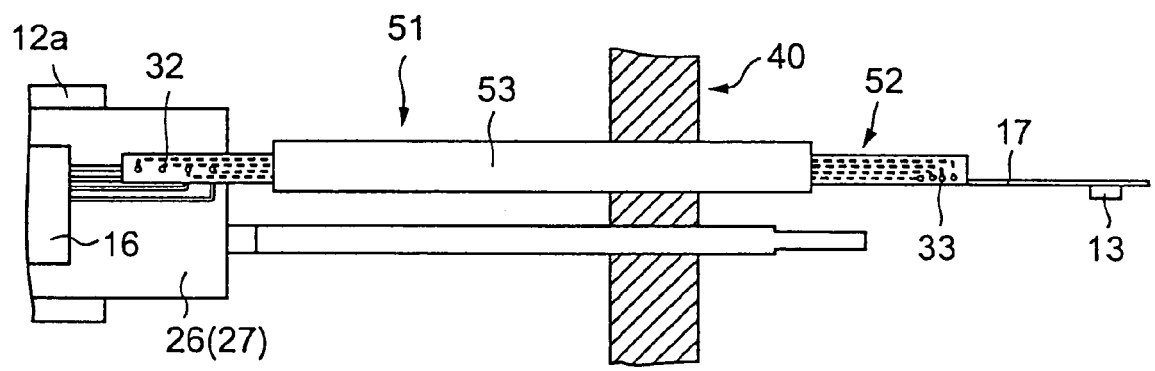
FIG. 15 is a view showing attachment of the signal relay member to the sub-assembly.
Figure 17A:
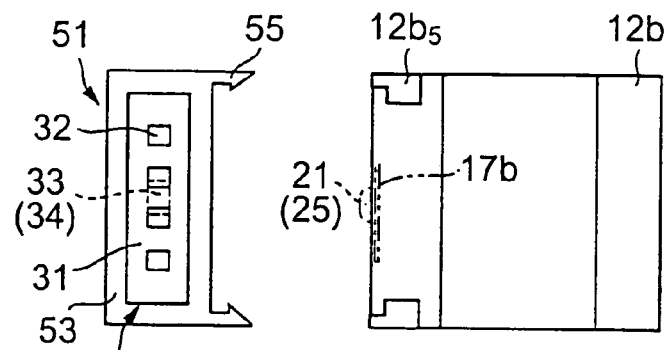
FIGS. 17A through 17E are cross-sectional views showing the operations of attaching the signal relay member to the sub-assembly.
Figure 17B:
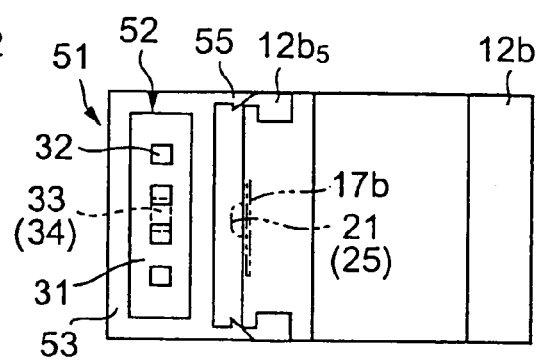
Figure 17C:
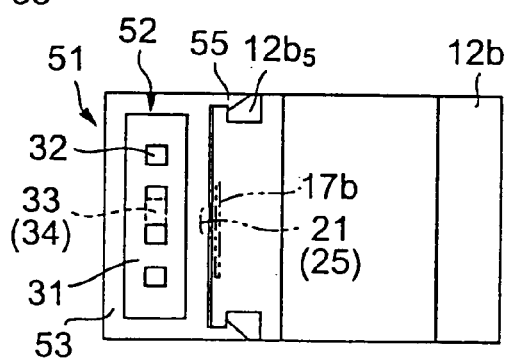

As illustrated in FIG. 17A and FIG. 17B, the hooks 54, 55 are aligned with the groves 12b6 and 12b5, respectively, and the signal relay member 51 is brought close to and pressed against the side surface 12b1 of the arm portion 12b. Therefore, as illustrated in FIG. 15 and FIG. 17C, the hooks 54, 55 are engaged with the grooves 12b6 and 12b5, respectively, to sandwich the arm portion 12b, and the signal relay member 51 is latched at two positions and is fixed on the side surface 12b1 of the arm portion 12b.

Figure 16:
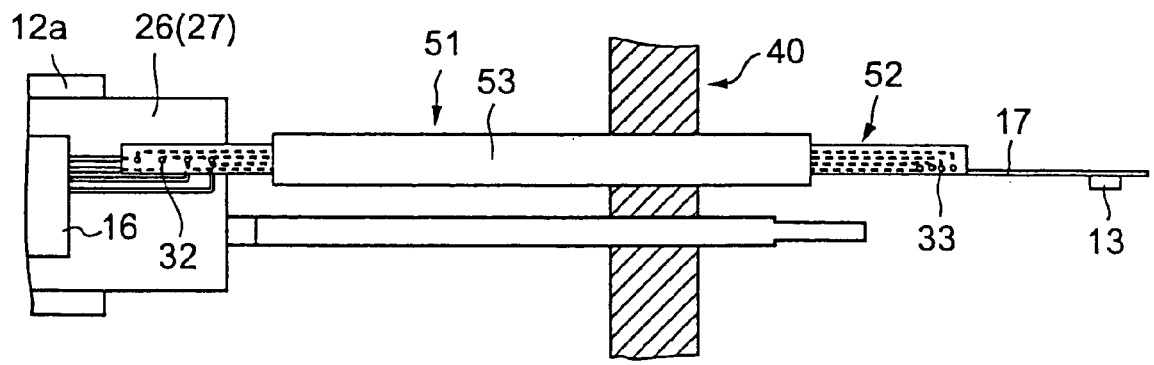
FIG. 16 is a view showing connection of terminals of the signal relay member.
Figure 17D:
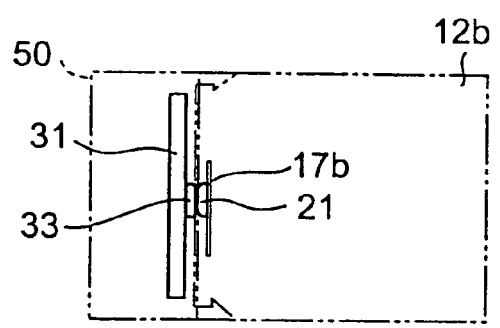
Figure 17E:
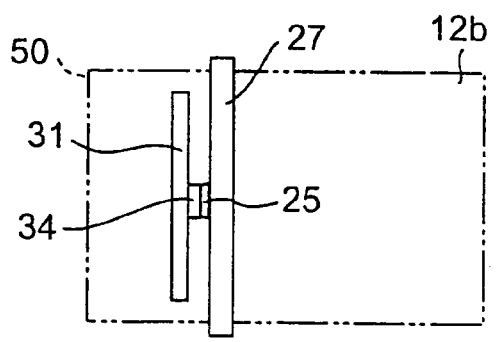

Next, solder is applied for heating and pressing, as illustrated in FIG. 16 and FIG. 17D, the terminals 33 are bonded with the terminals 21 by the solder, and, as illustrated in FIG. 17E, the terminals 34 are bonded with the terminals 25 by the solder.

Hence, the signal relay member 51 is mounted on the sub-assembly 11 and the arm portion 12b of the carriage arm body 12, the magnetic head 19 is electrically connected to the head IC 16 through the wiring pattern 20 and the signal relay member 51, and assembly of the carriage arm assembly 10 is completed.

Because the hooks 54, 55 are engaged with the grooves 12b6 and 12b5, respectively, the fixing positions, at which the signal relay member 51 is fixed on the side surface 12b1 of the arm portion 12b, are uniquely defined in the X1–X2 direction and in the Z1–Z2 direction, and at the fixing positions, the terminals 33 face the terminals 21, and the terminals 34 face the terminals 25. Therefore, when attaching the signal relay member 51 to the arm portion 12b, the operation of adjusting their positions is not necessary, and this makes the operation of attaching the signal relay member 51 to the sub-assembly 11 and automation of the operation easy.

Next, an explanation is given to the issue of preventing the magnetic head 19 from being destroyed by static electricity.

The signal relay member 51 may possess static electricity if it is subjected to friction while being mounted.

Because the signal relay member 51 is wrapped with the wrapping portion 53, nearly all of which is conductive, as illustrated in FIG. 17B, when the hooks 54, 55 are in contact with the arm portion 12b, the static electricity possessed by the signal relay member 51 flows to the arm portion 12b through the wrapping portion 53, hooks 54, 55, and further, flows to ground through the assembly fixture 40; therefore, the signal relay member 51 and the sub-assembly 11 are at the same potential.

When the signal relay member 51 is brought to the proximity of the side surface 12b1 of the arm portion 12b, and the hooks 54, 55 are brought into contact with the arm portion 12b, the terminals 33, 34 are not yet contacting the terminals 21 and 25.

The terminals 33, 34 are brought into contact with the terminals 21 and 25 only after the signal relay member 51 is fixed on the arm portion 12b and the solder is applied.

When the terminals 33, 34 are in contact with the terminals 21 and 25, because the signal relay member 51 and the sub-assembly 11 are at the same potential, there is no electric current in the magnetic head 19 caused by the static electricity; therefore, destroying the magnetic head 19 by static electricity does not occur at all. Further, because there is no current caused by the static electricity in the head IC 16, destroying the head IC 16 by static electricity does not occur at all.

Second Embodiment

Figure 18:
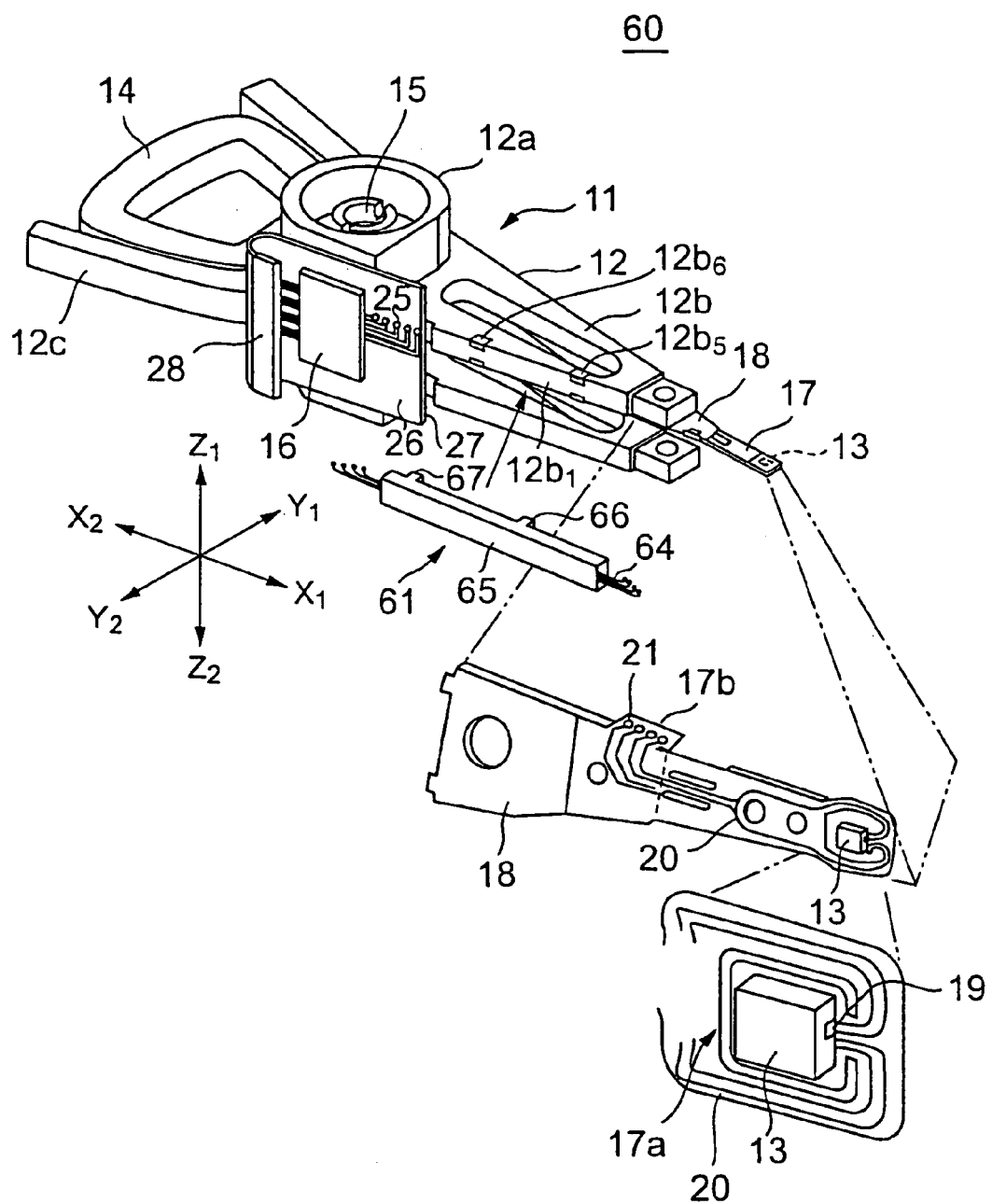
FIG. 18 is a perspective view of a carriage arm assembly according to a second embodiment of the present invention.

FIG. 18 is a perspective view of a carriage arm assembly 60 according to a second embodiment of the present invention.

The carriage arm assembly 60 has the same structure as that of the carriage arm assembly 50 shown in FIG. 8 except for a signal relay member 61.

Figure 19:
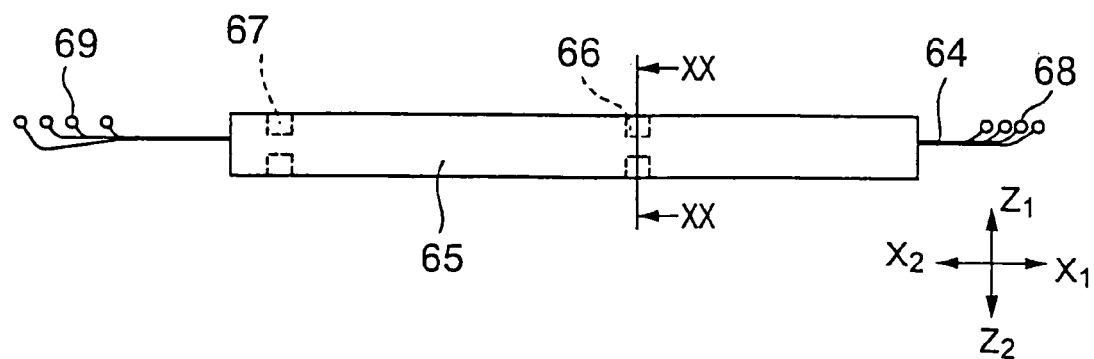
FIG. 19 is a front view of the signal relay member in FIG. 18.
Figure 20:
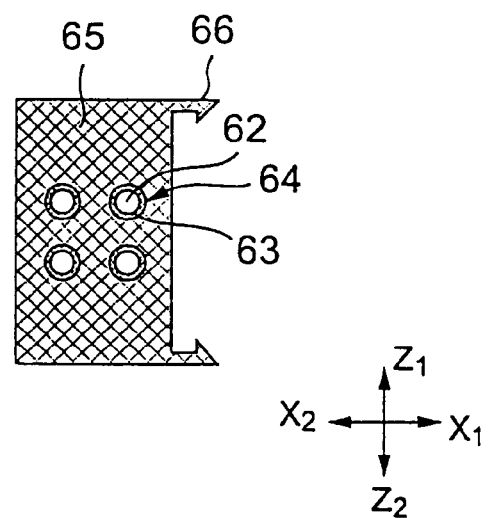
FIG. 20 is an enlarged cross-sectional view of the signal relay member along the line XX—XX in FIG. 19.

The signal relay member 61 has a structure able to suppress influence of noise. As illustrated in FIG. 19 and FIG. 20, instead of the wiring pattern 32 in the first embodiment, a number of polyurethane-wrapped twisted copper wires 64 are used, in which copper wires 62 are twisted and wrapped by a polyurethane wrapping portion 63. Four polyurethane-wrapped twisted copper wires 64, except for the two ends of each of them, are further wrapped by a wrapping portion 65, which is formed from polycarbonate mixed with carbon acting as a charging prevention agent. A first pair of hooks 66 and a second pair of hooks 67 are formed integrally with the wrapping portion 65. The ends of the four polyurethane-wrapped twisted copper wires 64 are exposed out of the wrapping portion 65. On the X1 side, terminals 68 are arranged in the same manner as the aforesaid terminals 33, and on the X2 side, terminals 69 are arranged in the same manner as the aforesaid terminals 34.

Similar to the first embodiment, the hooks 66 and 67 are engaged with the respective grooves 12b5 and 12b6 so as to position the signal relay member 61, and the signal relay member 61 is attached to the sub-assembly 11 with the static electricity running away (discharging to ground). After that, terminals 68, 69 of each of the polyurethane-wrapped twisted copper wires 64 are connected to the terminals 21, 25, respectively, by solder.

While the invention has been described with reference to preferred embodiments, the invention is not limited to these embodiments, but numerous modifications could be made thereto without departing from the basic concept and scope described in the claims.

The invention claimed is:

1. A carriage arm assembly of a disk drive installed in the disk drive, comprising:
   a carriage arm;
   a head slider that is arranged at an end of the carriage arm; and
   a signal relay member that is attached to the carriage arm to relay signals to the head slider, wherein the signal relay member includes a wire covered by an insulating material, and a wrapping portion that is conductive and wraps the insulating material, and a hook part that is projecting from the wrapping portion;

an arm portion of the carriage arm has an engagement portion for engagement with the hook part; and the signal relay member is installed by engaging the hook part with the engagement portion.

2. The carriage arm assembly as claimed in claim 1, wherein a plurality of the hook parts of the signal relay member are arranged in pairs at a plurality of positions on the signal relay member in a longitudinal direction thereof so as to sandwich the arm portion of the carriage arm.

3. The carriage arm assembly as claimed in claim 1, wherein the wire of the signal relay member includes twisted copper threads covered by the insulating material.

4. A signal relay member that is arranged on a side surface of an arm portion of a carriage arm to connect a head slider and a head IC, said signal relay member comprising:

a wire covered by an insulating material;

a wrapping portion that is conductive and wraps the insulating material, and a hook part that is projecting from the wrapping portion.

5. The signal relay member as claimed in claim 4, wherein a plurality of the hook parts are arranged in pairs at a plurality of positions on the signal relay member in a longitudinal direction thereof so as to sandwich the arm portion of the carriage arm.

* * * * *